US010287881B2

(12) United States Patent
de Sousa et al.

(10) Patent No.: US 10,287,881 B2
(45) Date of Patent: May 14, 2019

(54) CUTTING DEVICE WITH WEAR ELEMENTS

(71) Applicant: Joy MM Delaware, Inc., Wilmington, DE (US)

(72) Inventors: Joaquim Antonio Soares de Sousa, Gauteng (ZA); Michael Laing, Gauteng (ZA)

(73) Assignee: Joy Global Underground Mining LLC, Warrendale, PA (US)

( * ) Notice: Subject to any disclaimer, the term of this patent is extended or adjusted under 35 U.S.C. 154(b) by 0 days.

(21) Appl. No.: 15/606,651

(22) Filed: May 26, 2017

(65) Prior Publication Data

US 2017/0342829 A1 Nov. 30, 2017

Related U.S. Application Data

(60) Provisional application No. 62/342,438, filed on May 27, 2016, provisional application No. 62/342,254,
(Continued)

(51) Int. Cl.

| | |
|---|---|
| ***E21C 27/00*** | (2006.01) |
| ***E21C 25/06*** | (2006.01) |
| ***E21B 3/02*** | (2006.01) |
| ***E21C 25/18*** | (2006.01) |
| ***E02F 5/20*** | (2006.01) |
| ***E21B 3/03*** | (2006.01) |
| ***E21D 9/10*** | (2006.01) |

(Continued)

(52) U.S. Cl.
CPC ................ *E21C 25/06* (2013.01); *E02F 5/20* (2013.01); *E21B 3/02* (2013.01); *E21B 3/03* (2013.01); *E21C 25/18* (2013.01); *E21C 27/02* (2013.01); *E21D 9/102* (2013.01); *B26D 2001/0046* (2013.01); *E21C 27/16* (2013.01); *E21C 31/02* (2013.01); *E21D 9/1013* (2013.01)

(58) Field of Classification Search
CPC ...................................................... E21C 25/18
See application file for complete search history.

(56) References Cited

U.S. PATENT DOCUMENTS 2,763,258 A 9/1956 Hughes
3,048,160 A * 8/1962 Griffin ................ B23D 61/026 125/15

(Continued)

FOREIGN PATENT DOCUMENTS

JP 2007169947 7/2007

OTHER PUBLICATIONS

International Search Report and Written Opinion for Application No. PCT/US2017/034738 dated Aug. 25, 2017 (15 pages).

(Continued)

*Primary Examiner* — Janine M Kreck
(74) *Attorney, Agent, or Firm* — Michael Best & Friedrich LLP

(57) ABSTRACT

A cutting device for a cutting head includes a disc, a plurality of cutting elements secured to the disc, and a plurality of wear elements secured to the disc. The disc rotates about an axis of rotation, and the disc includes a peripheral edge. The cutting elements are spaced apart from one another along the peripheral edge of the disc. The wear elements are spaced apart from one another and from the cutting elements.

18 Claims, 15 Drawing Sheets

Related U.S. Application Data filed on May 27, 2016, provisional application No. 62/446,799, filed on Jan. 16, 2017.

(51) Int. Cl.

| | |
|---|---|
| ***E21C 27/02*** | (2006.01) |
| *B26D 1/00* | (2006.01) |
| *E21C 27/16* | (2006.01) |
| *E21C 31/02* | (2006.01) |

(56) References Cited

U.S. PATENT DOCUMENTS

| | | | |
|---|---|---|---|
| 3,411,826 A | 11/1968 | Wallers et al. | |
| 3,461,983 A | 8/1969 | Hudson et al. | |
| 3,633,637 A | 1/1972 | Kolesh | |
| 3,647,625 A | 3/1972 | Pentith | |
| 3,952,815 A | 4/1976 | Dysart | |
| 4,202,419 A | 5/1980 | Youngblood | |
| 4,466,498 A | 8/1984 | Bardwell | |
| 4,499,958 A * | 2/1985 | Radtke | E21B 10/55 175/428 |
| 4,527,641 A | 7/1985 | Klemm | |
| 4,751,972 A | 6/1988 | Jones et al. | |
| 4,755,004 A | 7/1988 | Palmquist | |
| 4,838,366 A | 6/1989 | Jones | |
| 5,129,296 A * | 7/1992 | Wayne | B23D 45/00 144/218 |
| 5,139,099 A | 8/1992 | Hayashi et al. | |
| 5,143,163 A | 9/1992 | Stiffler et al. | |
| 5,291,807 A | 3/1994 | Vanderford et al. | |
| 5,722,497 A | 3/1998 | Gum et al. | |
| 5,884,979 A | 3/1999 | Latham | |
| 6,260,637 B1 | 7/2001 | Haussmann et al. | |
| 6,290,008 B1 | 9/2001 | Portwood et al. | |
| 6,343,842 B1 | 2/2002 | Sauer et al. | |
| 6,367,569 B1 | 4/2002 | Walk | |
| 6,561,590 B2 | 5/2003 | Sugden | |
| 6,692,083 B2 | 2/2004 | Latham | |
| 6,766,870 B2 | 7/2004 | Overstreet | |
| 7,182,407 B1 * | 2/2007 | Peach | E21C 25/16 299/75 |
| 7,240,746 B2 | 7/2007 | Overstreet et al. | |
| 7,338,135 B1 | 3/2008 | Hall et al. | |
| 7,401,537 B1 * | 7/2008 | Krauter | B23K 26/34 148/903 |
| 7,770,664 B2 | 8/2010 | Laird et al. | |
| 8,007,049 B2 | 8/2011 | Fader et al. | |
| 8,016,056 B2 | 9/2011 | Viswanadham et al. | |
| 8,276,577 B2 * | 10/2012 | Wills, II | B23D 47/04 125/13.01 |
| 8,522,899 B2 | 9/2013 | Bouaphanh | |
| 8,523,288 B2 | 9/2013 | Hanaoka et al. | |
| 8,777,326 B2 | 7/2014 | Hall | |
| 9,062,502 B2 | 6/2015 | King | |
| 9,803,476 B2 | 10/2017 | Raschka et al. | |
| 2008/0036279 A1 | 2/2008 | Hall et al. | |
| 2010/0104382 A1 | 4/2010 | Heinloth | |
| 2012/0198671 A1 | 8/2012 | Meidar et al. | |
| 2013/0014999 A1 | 1/2013 | King | |
| 2013/0181501 A1 | 7/2013 | Hall et al. | |
| 2015/0030397 A1 | 1/2015 | Heinloth | |
| 2017/0342830 A1 | 11/2017 | de Sousa et al. | |
| 2017/0342835 A1 | 11/2017 | de Sousa et al. | |

OTHER PUBLICATIONS

International Search Report and Written Opinion for Application No. PCT/US2017/034729 dated Aug. 25, 2017 (15 pages).

International Search Report and Written Opinion for Application No. PCT/US2017/034713 dated Aug. 25, 2017 (13 pages).

* cited by examiner

CUTTING DEVICE WITH WEAR ELEMENTS

CROSS-REFERENCE TO RELATED APPLICATIONS

This application claims the benefit of prior-filed, U.S. Provisional Application No. 62/342,438, filed May 27, 2016, U.S. Provisional Application No. 62/342,254, filed May 27, 2016, and U.S. Provisional Patent Application No. 62/446,799, filed Jan. 16, 2017. The entire contents of these documents are incorporated by reference herein.

BACKGROUND

The present invention relates to machines for mining or excavation, and more particularly to a cutting mechanism for a machine for mining or excavation.

Mining machines may incorporate cutting discs to engage rock walls in order to cut and remove rock and/or mineral. The cutting disc may be rotated and driven to undercut the rock wall at a narrow angle to generate shearing forces to cause the rock to fracture. Each cutting disc has a plurality of bits or bits positioned on a periphery of the disc.

SUMMARY

In one aspect, a cutting device for cutting rock, a plurality of cutting elements, and a plurality of wear elements. The disc rotates about an axis of rotation and includes a peripheral edge. The plurality of cutting elements are secured to the disc, and are spaced apart from one another along the peripheral edge of the disc. The plurality of wear elements are secured to the disc, and the wear elements are spaced apart from one another and from the cutting elements.

In another aspect, a cutting head for removing rock from a rock wall includes a boom configured to be supported on a frame, a drive mechanism, and a cutting device supported on the boom and driven by the drive mechanism. The cutting device includes a disc, a plurality of cutting elements, and a plurality of wear elements. The disc rotates about an axis of rotation and includes a peripheral edge. The plurality of cutting elements are secured to the disc and are spaced apart from one another along the peripheral edge of the disc. The plurality of wear elements are secured to the disc, and the wear elements are spaced apart from one another and from the cutting elements.

In yet another aspect, s cutting device includes a disc, a plurality of cutting elements, and a plurality of wear elements. The disc rotates about an axis of rotation and the disc includes a peripheral edge. The plurality of cutting elements are secured to the disc, and the cutting elements are spaced apart from one another along the peripheral edge of the disc. Each of the cutting elements protrudes from the disc in a first direction by a first distance. The plurality of wear elements are secured to the disc, and the wear elements are spaced apart from one another and from the cutting elements. Each of the wear elements protrude from the disc in the first direction by a second distance less than the first distance.

Other features and aspects will become apparent by consideration of the following detailed description and accompanying drawings.

Before any embodiments are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical or hydraulic connections or couplings, whether direct or indirect. Also, electronic communications and notifications may be performed using any known means including direct connections, wireless connections, etc.

DETAILED DESCRIPTION

Figure 1:
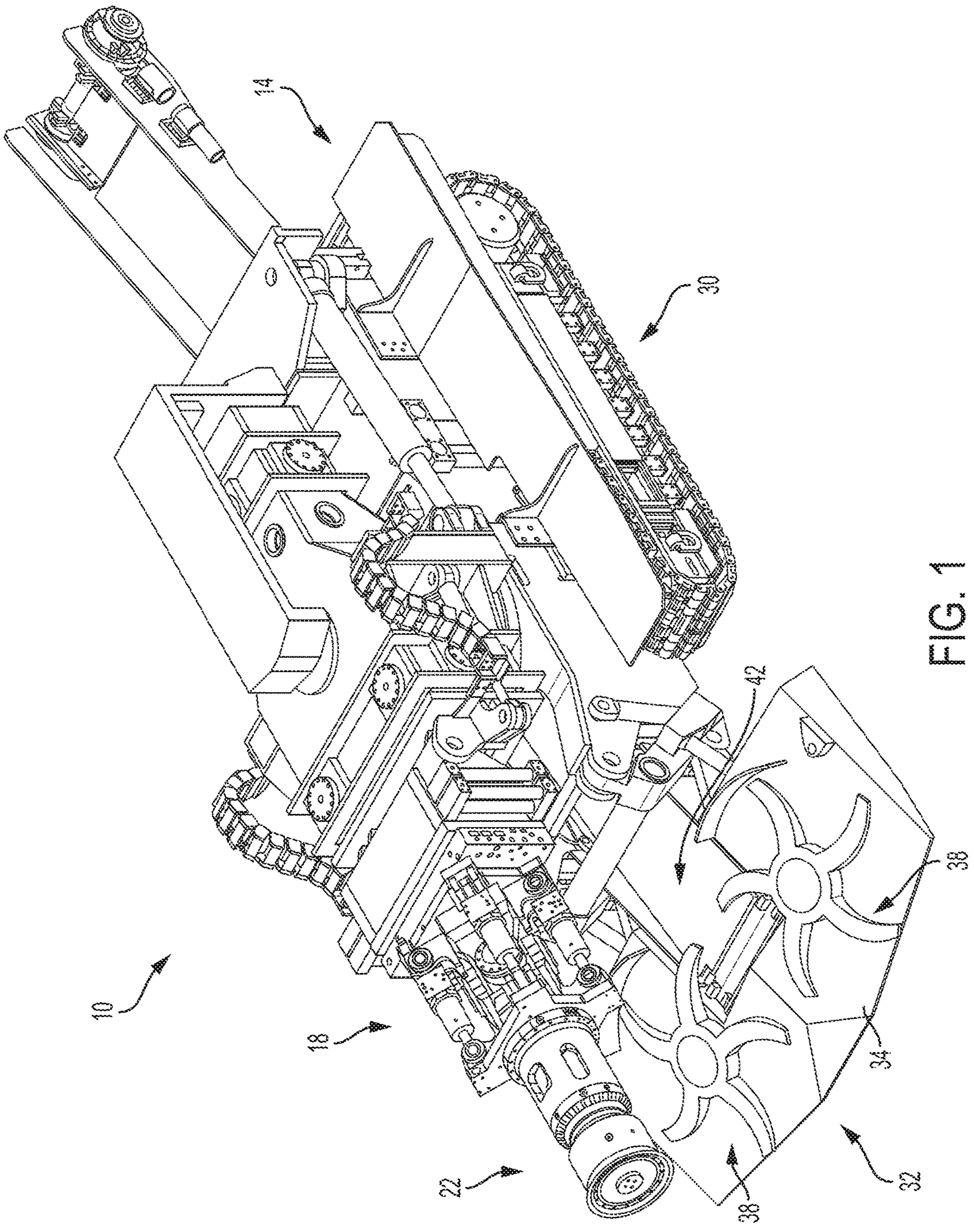
FIG. 1 is a perspective view of a mining machine.

FIG. 1 illustrates an exemplary mining machine 10 including a frame 14, a boom 18, and a cutting head 22 supported on the boom 18 for engaging a mine wall. The frame 14 includes a drive system including traction devices, such as tracks 30, for moving the frame 14 over a support surface or mine floor. In the illustrated embodiment, the frame 14 further includes a gathering head 32 positioned adjacent the mine floor proximate the cutting head 22. The gathering head 32 includes a deck 34 and rotating members 38 that direct cut material from the deck 34 onto a conveyor 42. In some embodiments, the frame 14 may also include arms for directing cut material onto the deck 34. In the illustrated embodiment, the mining machine 10 includes a single cutting head; in other embodiments, the machine 10 may include multiple cutting heads.

Figure 2:
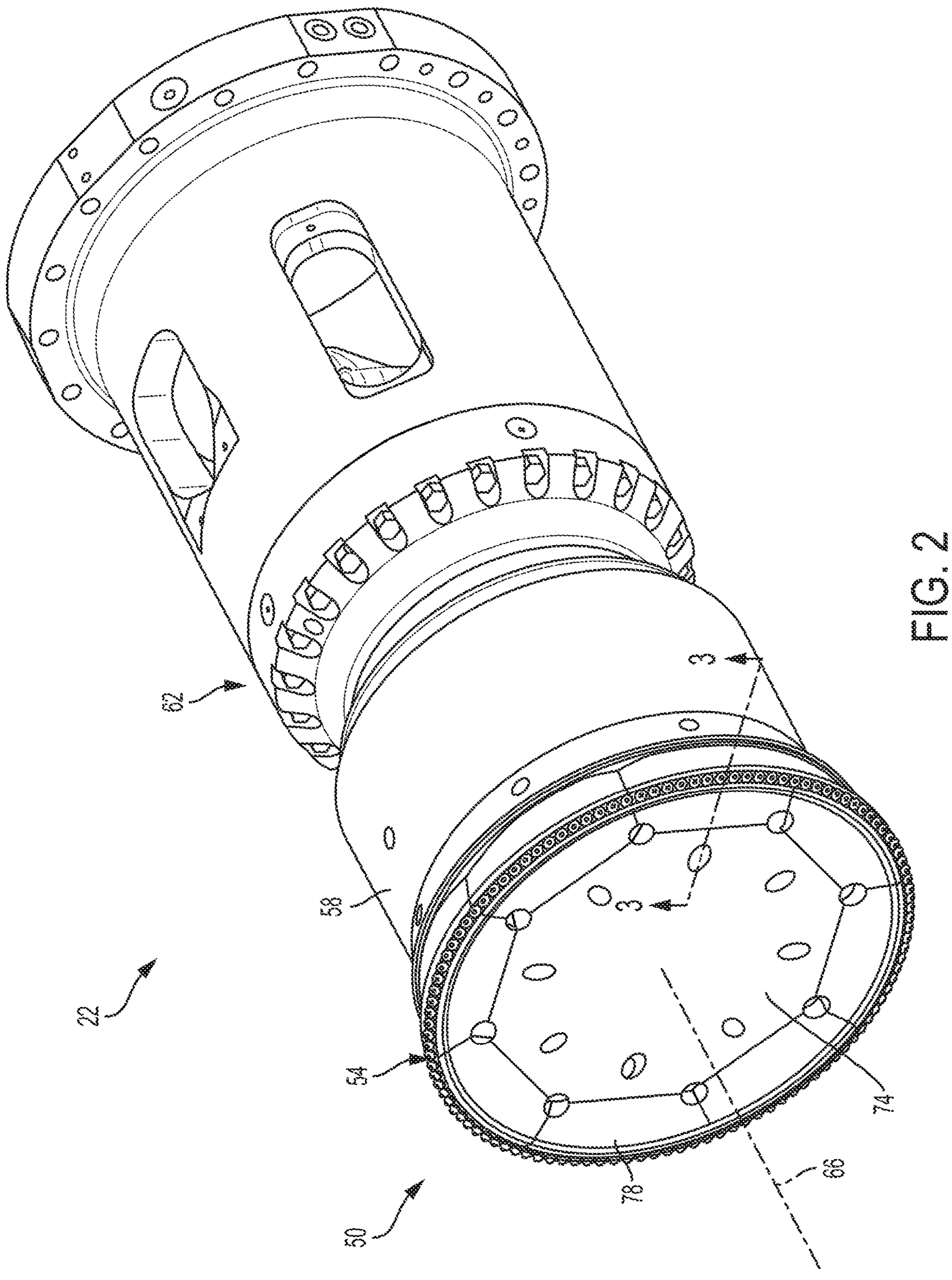
FIG. 2 is a perspective view of a cutting head of a mining machine.
Figure 2A:
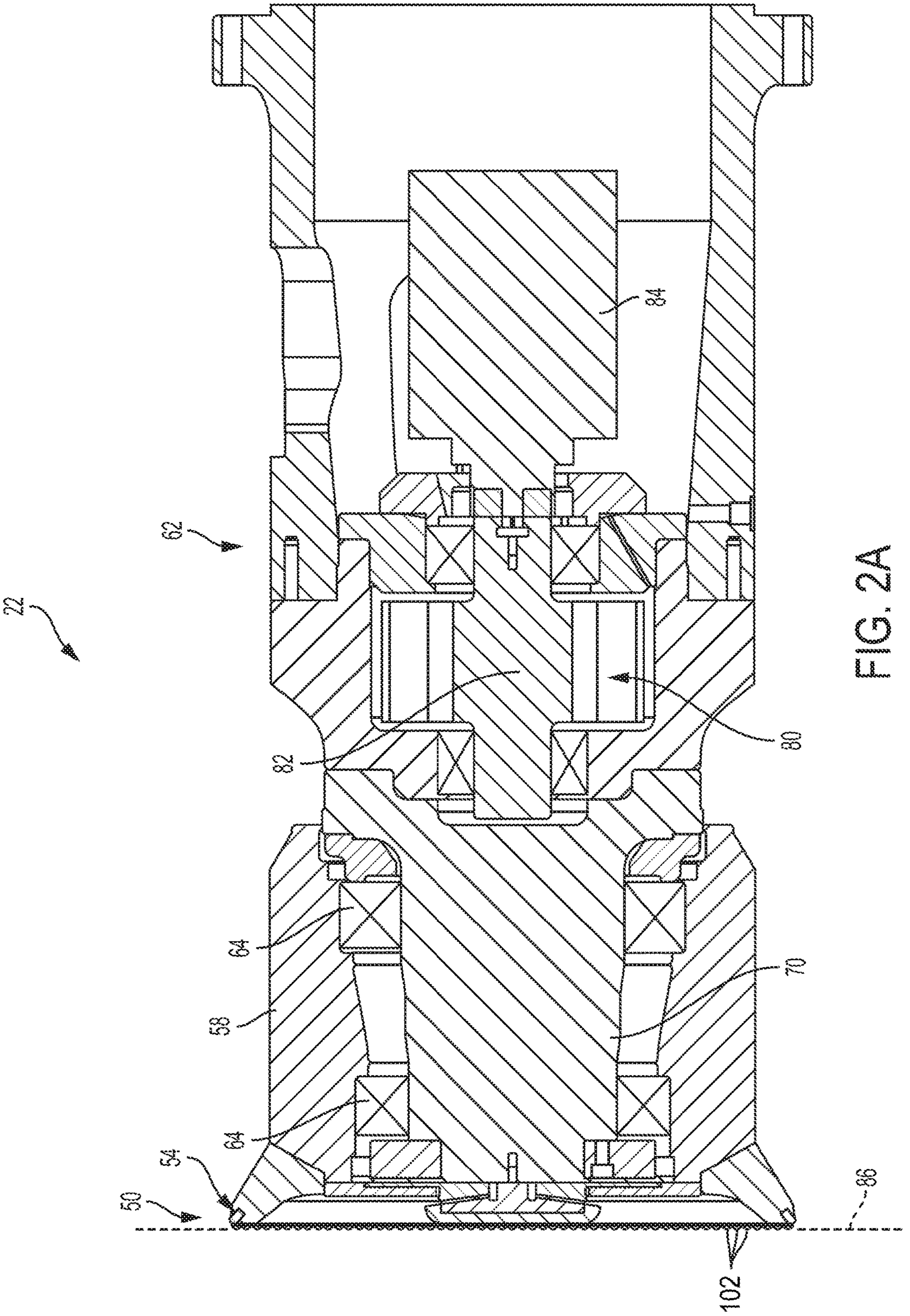
FIG. 2A is a cross-sectional view of the cutting head of FIG. 2, viewed along section 2A-2A.
Figure 3:
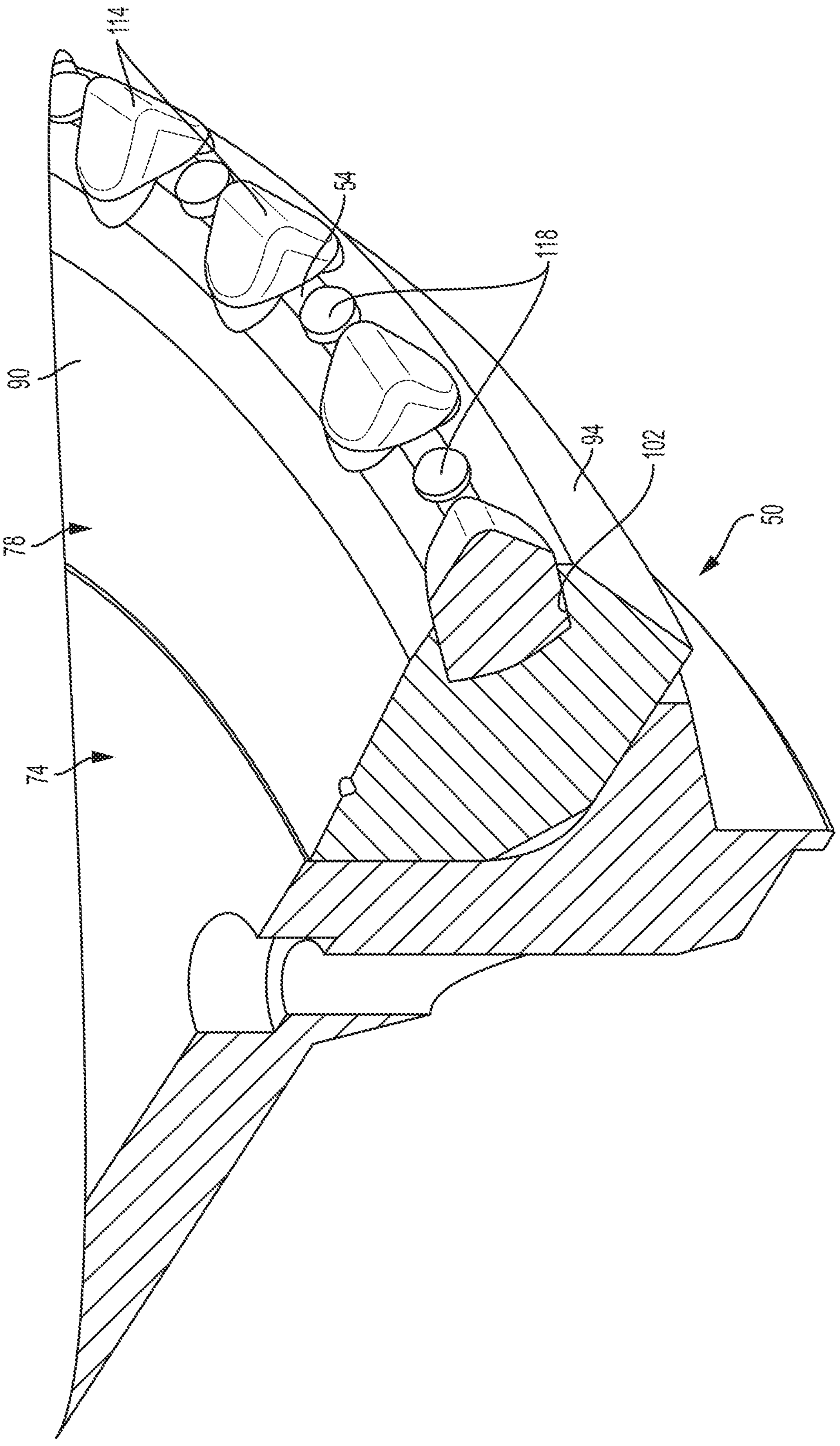
FIG. 3 is a perspective view of a cross section of a cutting disc for the cutting head of FIG. 2, viewed along section 3-3.
Figure 4:
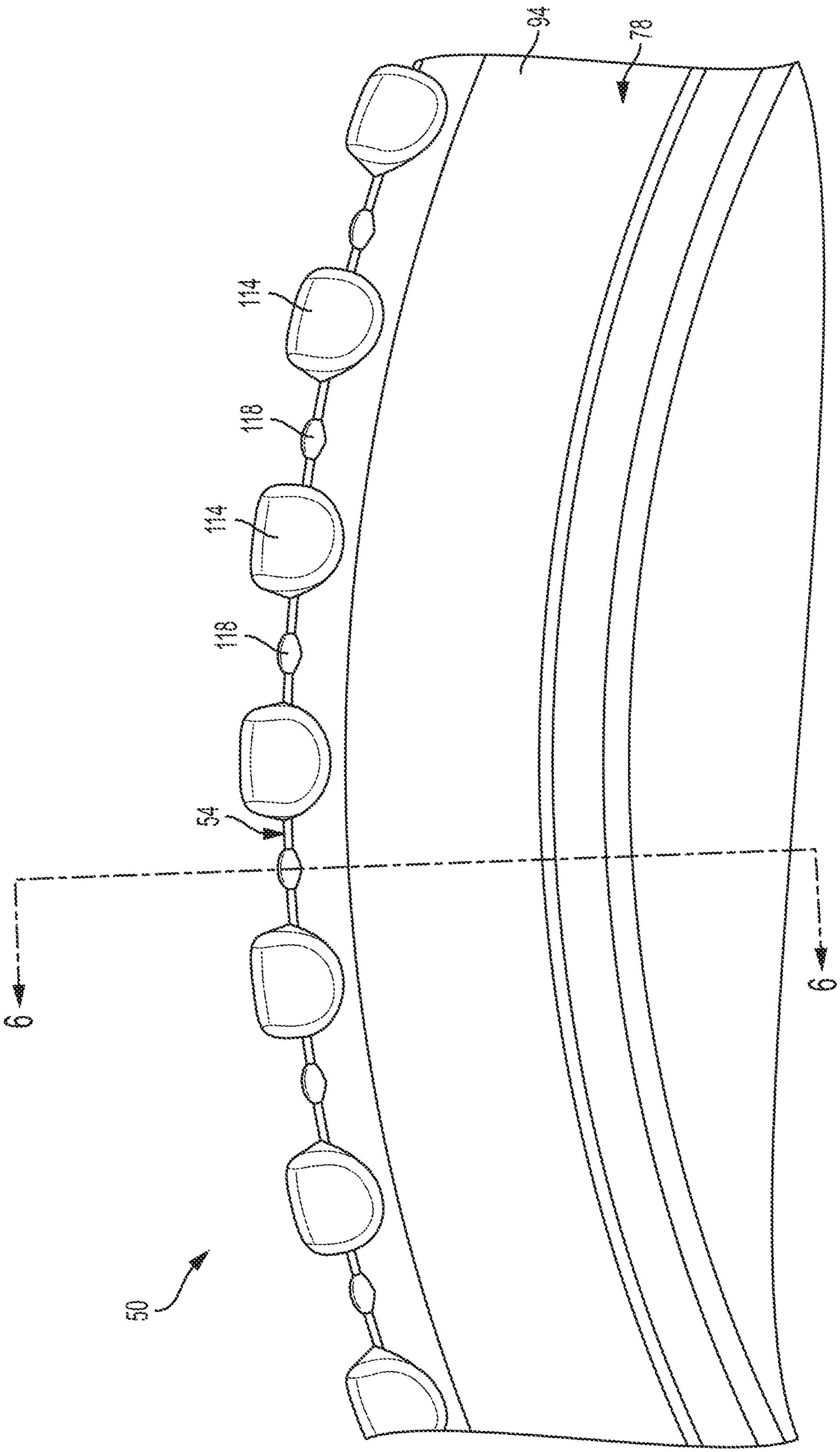
FIG. 4 is a side view of a portion of the cutting disc of FIG. 3.
Figure 5:
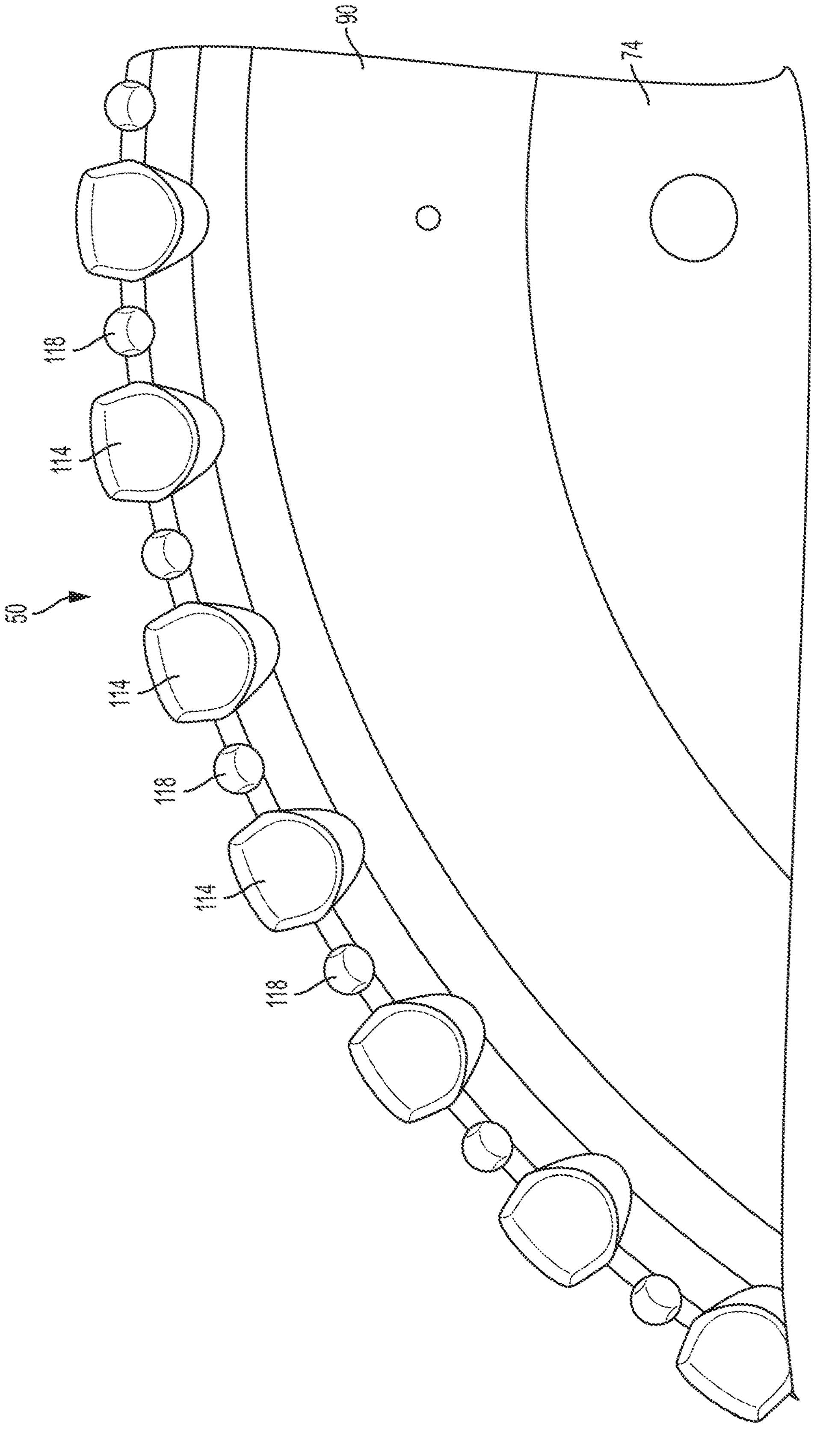
FIG. 5 is a plan view of a portion of the cutting disc of FIG. 3.

As shown in FIGS. 2 and 3, the cutting head 22 includes a cutting disc 50 having an outer edge or peripheral edge 54, and the cutting disc 50 engages a mine wall (not shown) to remove rock from the wall. In the illustrated embodiment, the cutting head 22 further includes a carrier 58 and an arm 62. The disc 50 is coupled to the carrier 58, which is supported for rotation (e.g., by bearings 64—FIG. 2A) relative to the arm 62 about an axis of rotation 66. In the illustrated embodiment, the cutting disc 50 and/or carrier 58 are freely rotatable relative to the arm 62. As shown in FIG. 2A, in the illustrated embodiment, the arm 62 includes a shaft 70 supporting the carrier 58, and the cutting head 22 further includes an exciter assembly for inducing oscillation of the cutting head 22. The exciter assembly includes an eccentric exciter mass 80 coupled to a shaft 82 and supported for rotation on the arm 62, and a motor 84 for mechanically driving the exciter mass 80 to rotate. Rotation of the exciter mass 80 causes the cutting head 22 (including the cutting disc 50) to oscillate.

In some embodiments, the cutting head and disc may operate in a manner similar to that of the mining machine disclosed in U.S. Patent Application Publication No. 2014/0077578, filed Sep. 16, 2013, the entire contents of which are incorporated by reference herein. In other embodiments, the cutting head and disc operates in a similar manner to the cutting mechanism disclosed in U.S. Pat. No. 7,934,776, published May 3, 2011, the entire contents of which are incorporated by reference herein. In other embodiments, the cutting disc may be is driven to rotate in another manner.

Figure 6:
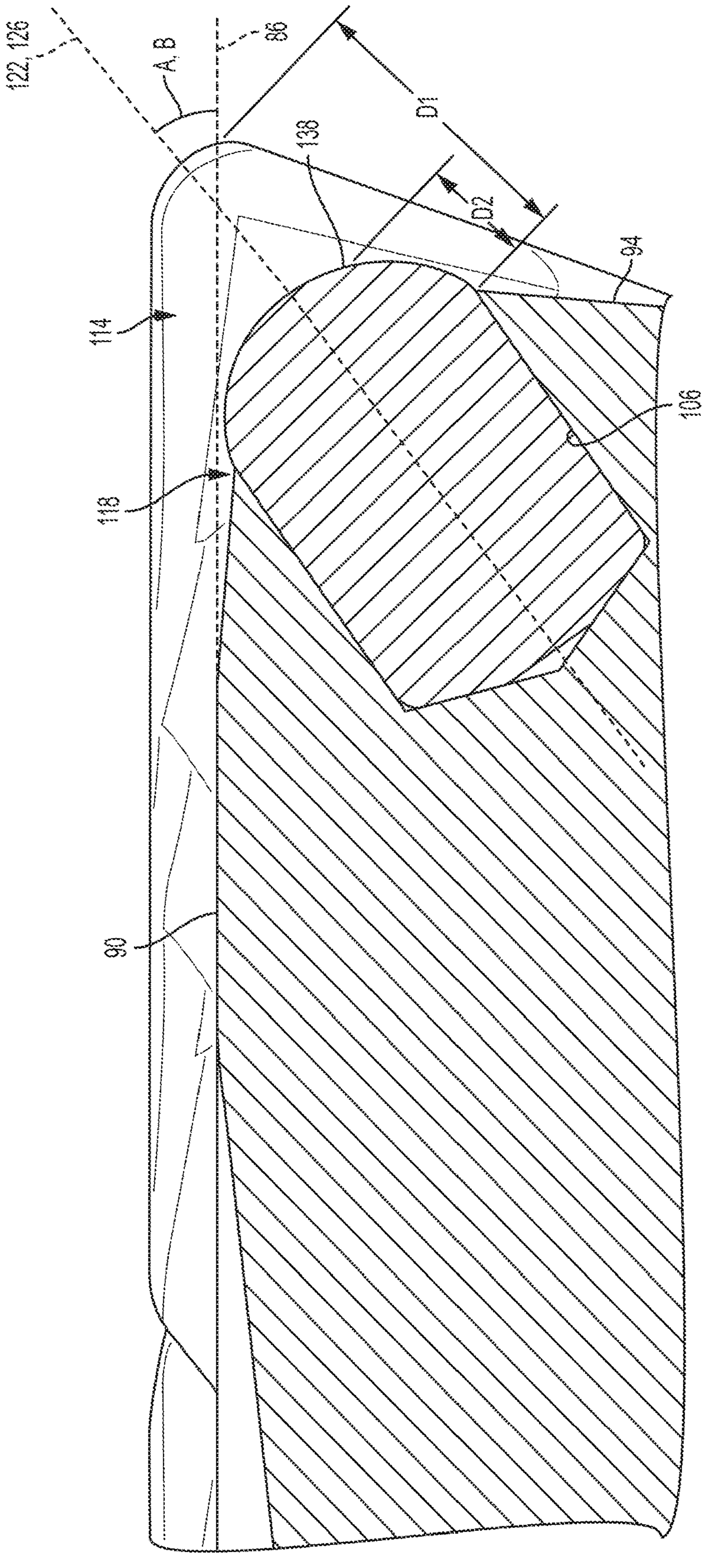
FIG. 6 is a cross-sectional view of the cutting disc of FIG. 3, viewed along section 6-6 in FIG. 4.

As shown in FIGS. 2 and 3, the cutting disc 50 includes a main support 74 secured to the carrier 58, and a cutting ring 78 extending around the main support 74. The cutting ring 78 forms the peripheral edge 54 positioned within a plane 86 (FIG. 6). In the illustrated embodiment, the peripheral edge 54 is formed at a junction between an end surface 90 (FIG. 3) of the cutting ring 78 (e.g., a distal end of the disc 50) and an outer lateral surface or peripheral surface 94 of the cutting ring 78. In some embodiments, the plane 86 is coplanar with the end surface 90 of the cutting ring 78 and is perpendicular to the axis of rotation 66 (FIG. 2) of the cutting disc 50. The peripheral surface 94 may have a substantially cylindrical or frustoconical shape, and may extend around the axis of rotation 66. In some embodiments, the cutting ring 78 may be formed as a plurality of radial sections independently secured to the main support 74.

The cutting ring 78 includes a plurality of bores 102 (FIG. 3) positioned along the peripheral edge 54. The bores 102 are configured to receive cutting elements or cutting buttons or cutting bits 114. In addition, the disc 50 includes wear elements or wear buttons or wear bits 118. In the illustrated embodiment, the cutting disc 50 is formed from rigid materials, such as steel or other metals. The cutting bits 114 are constructed from a first material and the wear bits 118 are constructed from a second material. In some embodiments, the second material is harder than the first material. The wear bits 118 resist wear on the structure of the cutting ring 78 and/or the main support 74, and potentially on the cutting bits 114, caused by engagement between the cutting disc 50 and rock strata.

Referring now to FIGS. 3-6, the cutting bits 114 are disposed at regular intervals along the peripheral edge 54 of the cutting ring 78. In the illustrated embodiment, each wear bit 118 is positioned on the peripheral edge 54 and disposed directly between two adjacent cutting bits 114, and the cutting bits 114 and wear bits 118 alternate along the perimeter of the disc 50. In other embodiments, the cutting bits 114 and wear bits 118 may be arranged in a different sequence.

As shown in FIG. 6, each wear bit 118 includes a longitudinal axis 122 oriented at an oblique angle A relative to the plane 86. In some embodiments, the angle A is between approximately 0 degrees and approximately 90 degrees. In addition, each cutting bit 114 includes a longitudinal axis 126 oriented at an oblique angle B relative to the cutting plane 86. In the illustrated embodiment, the longitudinal axis 126 of each cutting bit 114 and the longitudinal axis 122 of each wear bit 118 are oriented at substantially the same angle. The longitudinal axes 122, 126 extend through the peripheral edge 54.

In the illustrated embodiment, each cutting bit 114 protrudes from the surface of the cutting ring 78 at a distance D1, while the wear bits 118 extend away from the cutting ring 78 at a distance D2. In the illustrated embodiment, the distance D1 is greater than the distance D2. Stated another way, the cutting bits 114 may protrude from the cutting disc 50 more than the wear bits 118. In addition, the distances D1 and D2 may each have a radial component and an axial component. As used herein, the term "radial" refers to a direction that is perpendicular or substantially perpendicular to the axis of rotation 66, while the term "axial" refers to a direction that is parallel or substantially parallel to the axis of rotation 66. The radial component of the distance D1 can be greater than the radial component of the distance D2, and/or the axial component of the distance D1 can be greater than the axial component of the distance D2.

Figure 7:
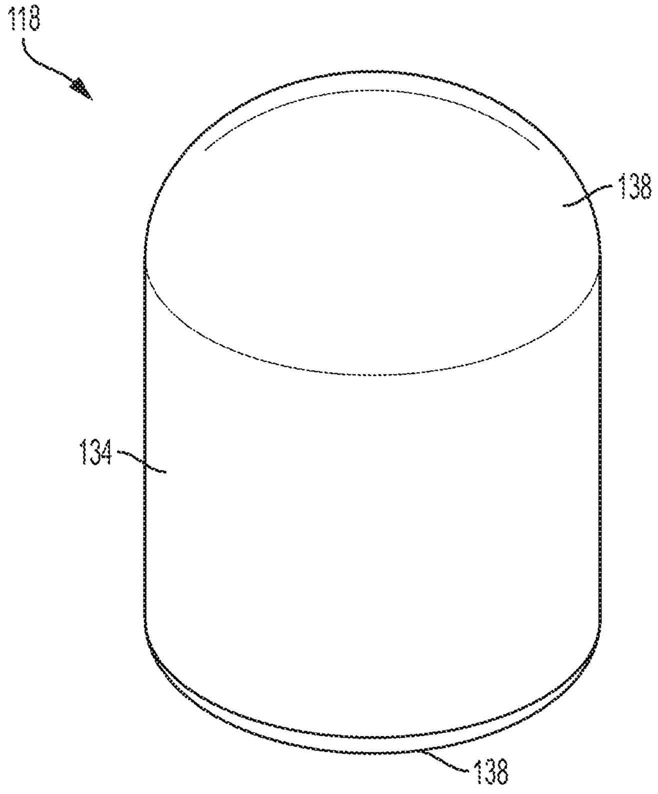
FIG. 7 is a perspective view of a wear bit.
Figure 8:
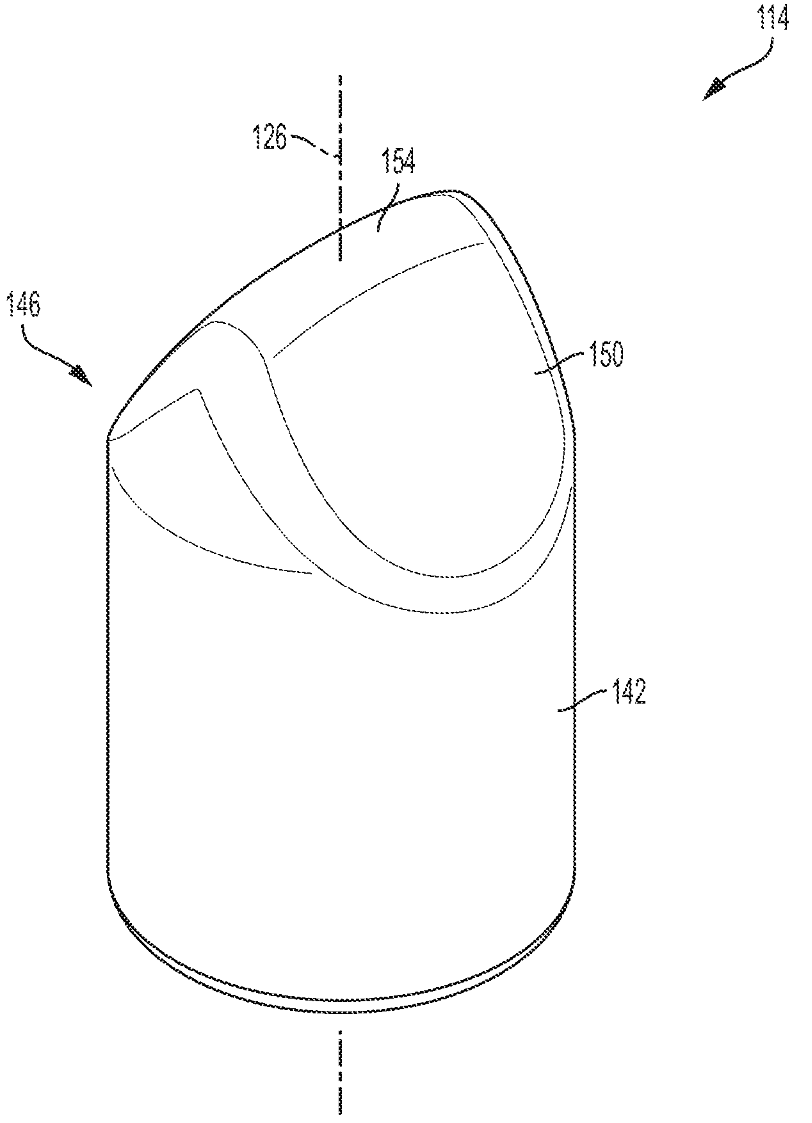
FIG. 8 is a perspective view of a cutting bit.
Figure 9:
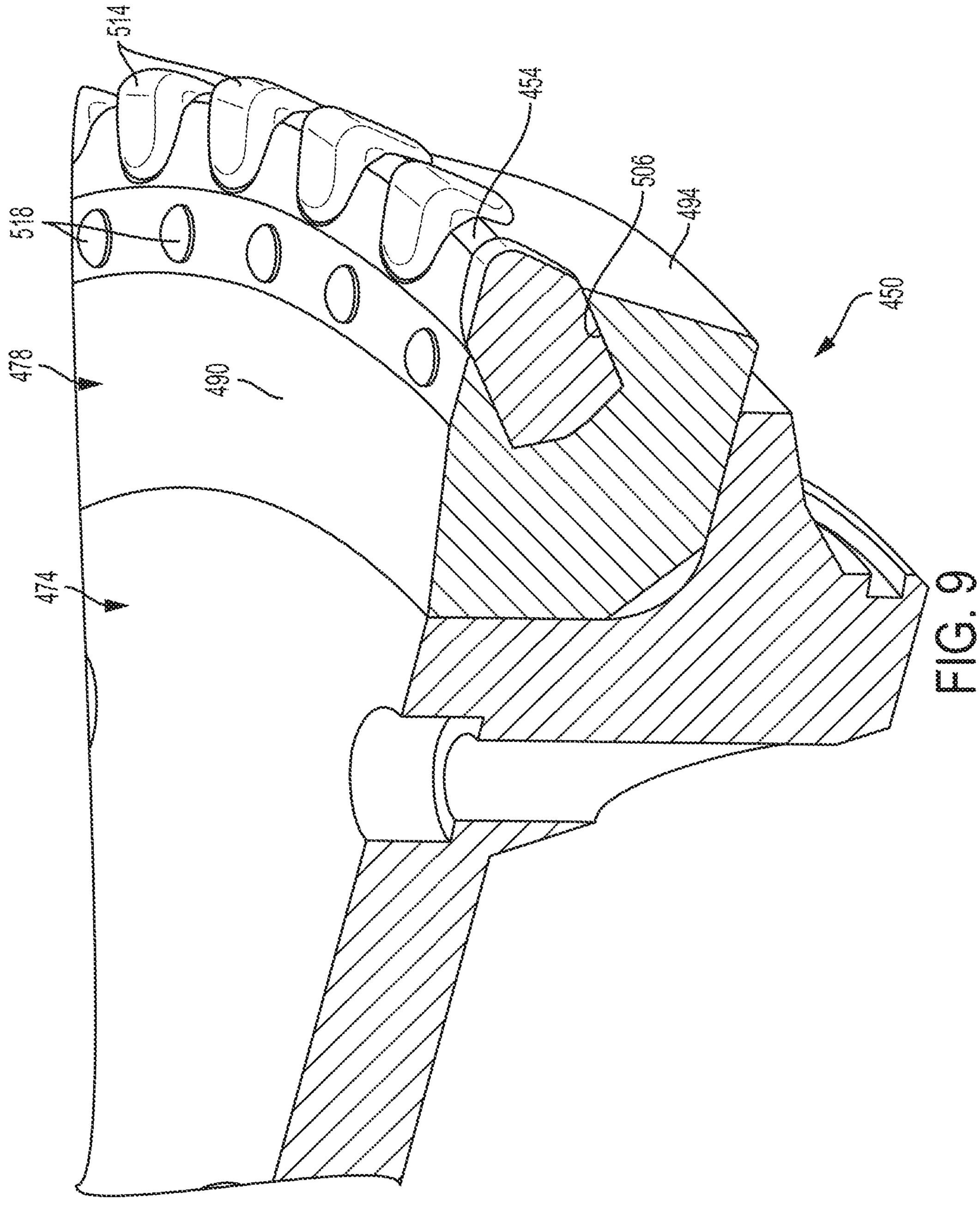
FIG. 9 is a perspective view of a cross section of a cutting disc according to another embodiment.
Figure 10:
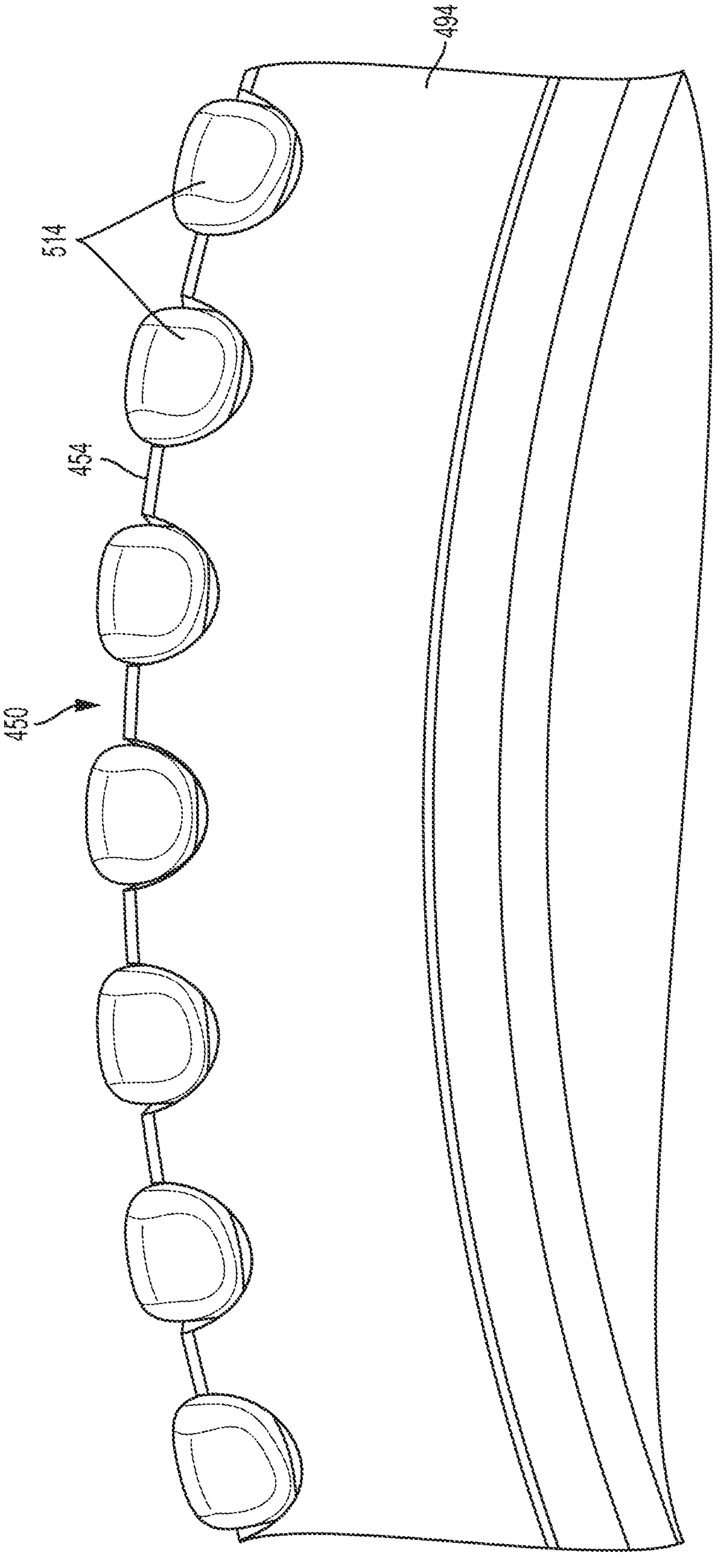
FIG. 10 is a side view of a portion of the cutting disc of FIG. 9.
Figure 11:
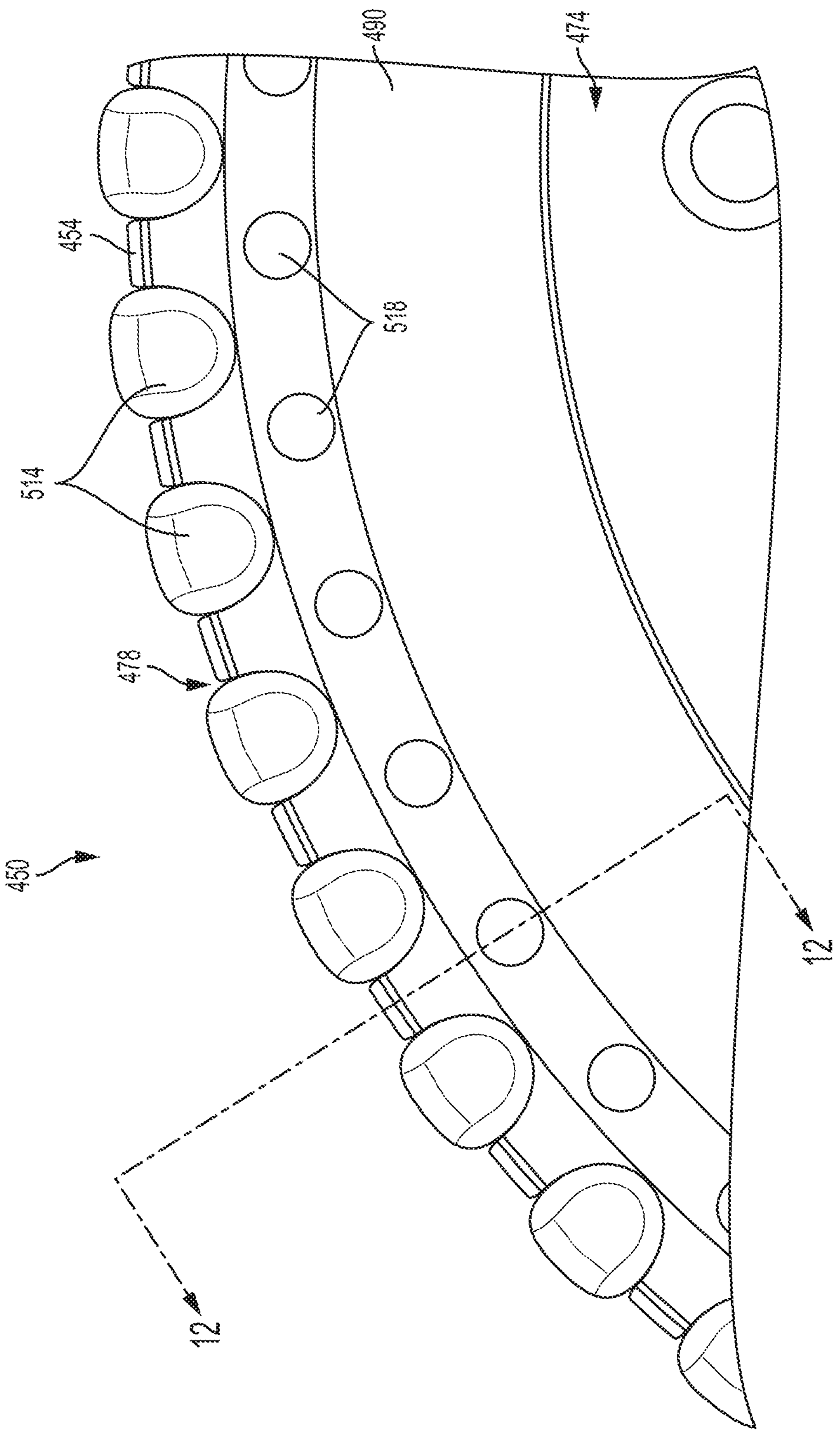
FIG. 11 is a plan view of a portion of the cutting disc of FIG. 9.

With reference to FIGS. 7 and 8, each wear bit 118 includes a main portion or cylindrical portion 134 and end portions 138 (FIG. 7). In the illustrated embodiment, each end portion 138 has a semi-spherical or dome shape. The cylindrical portion 134 is sized and shaped to be received in the cutting disc 50 (e.g., within one of a plurality of bores 106—FIG. 6) with one of the end portions 138 protruding from the cutting disc 50 to engage the rock wall. In some embodiments, the cylindrical portion 134 has a diameter between approximately 4 mm and approximately 10 mm. In some embodiments, the diameter of the cylindrical portion 134 is approximately 7 mm. Additionally, in other constructions, the wear bit 118 may have a ballistic shape, a parabolic shape, or any other shape considered useful for this application.

As shown in FIG. 8, in the illustrated embodiment, each cutting bit 114 includes a main portion or cylindrical portion 142 and an end portion 146 having two generally planar surfaces 150 joined along a tip or edge 154, and the longitudinal axis 126 of each cutting bit 114 extends through the cylindrical portion 142 and the edge 154. In other embodiments, the end portion 146 may have a different shape (e.g., conical, parabolic, ballistic, etc.). The cylindrical portion 142 is positioned within one of the bores 102 (FIG. 3) in the cutting disc 50, and the edge 154 of each cutting bit 114 protrudes from the bore 102 to engage the rock wall. In some embodiments, the cylindrical portion 142 has a diameter between approximately 12 mm and approximately 20 mm. In some embodiments, the diameter of the cylindrical portion 142 is approximately 16 mm. When the cutting bits 114 are received within the bores 102, the edges 154 are offset from and generally aligned with the peripheral edge 54 of the cutting disc 50. The edges 154 are oriented at an angle relative to the axis of rotation 66 of the cutting disc 50.

With continued reference to FIGS. 7 and 8, in some embodiments, the wear bits 118 are constructed from a harder material than the cutting bits 114. In one exemplary construction, the wear bits 118 can be formed from carbide and at least a portion of the cutting bits 114, such as the end portion 146, can be formed from carbide (e.g., a softer grade of carbide than the wear bits 118). In other embodiments, the wear bits 118 and/or cutting bits 114 can be formed from other materials. The positioning and material of the wear bits 118 advantageously reduces wear on the cutting bits 114 when the cutting bits 114 engage the rock strata during operation, while also preventing damage to the cutting disc 50 itself during operation. In addition, the relative size and hardness of the cutting bits 114 and wear bits 118 are configured to wear at predetermined rates such that each of the cutting bits 114 and wear bits 118 have a substantially similar usable lifetime. That is, the cutting bits 114 and wear bits 118 degrade down to a substantially level plane with the cutting disc 50 at about the same rate.

FIGS. 9-12 illustrate a cutting disc 450 according to another embodiment. The cutting disc 450 is similar to the cutting disc 50 described above with respect to FIGS. 3-6, and similar features are identified with similar reference numbers, plus 400. Cutting bits 514 are disposed at regular intervals along a peripheral edge 454 of the cutting ring 478, and wear bits 518 are disposed along a planar end surface 490 of the cutting ring 478 rather than directly between the cutting bits 514 along the peripheral edge 454. In the illustrated embodiment, each wear bit 518 is positioned between adjacent cutting bits 514, but spaced apart from the edge 454. Each of the cutting bits 514 and the wear bits 518 are substantially similar to the cutting bits 114 and wear bits 118 described above. It should be noted that the placement of the wear bits 518 according to this construction may be used in place of, or in conjunction with, the placement of the wear bits 118 from the construction of FIGS. 3-6.

Figure 12:
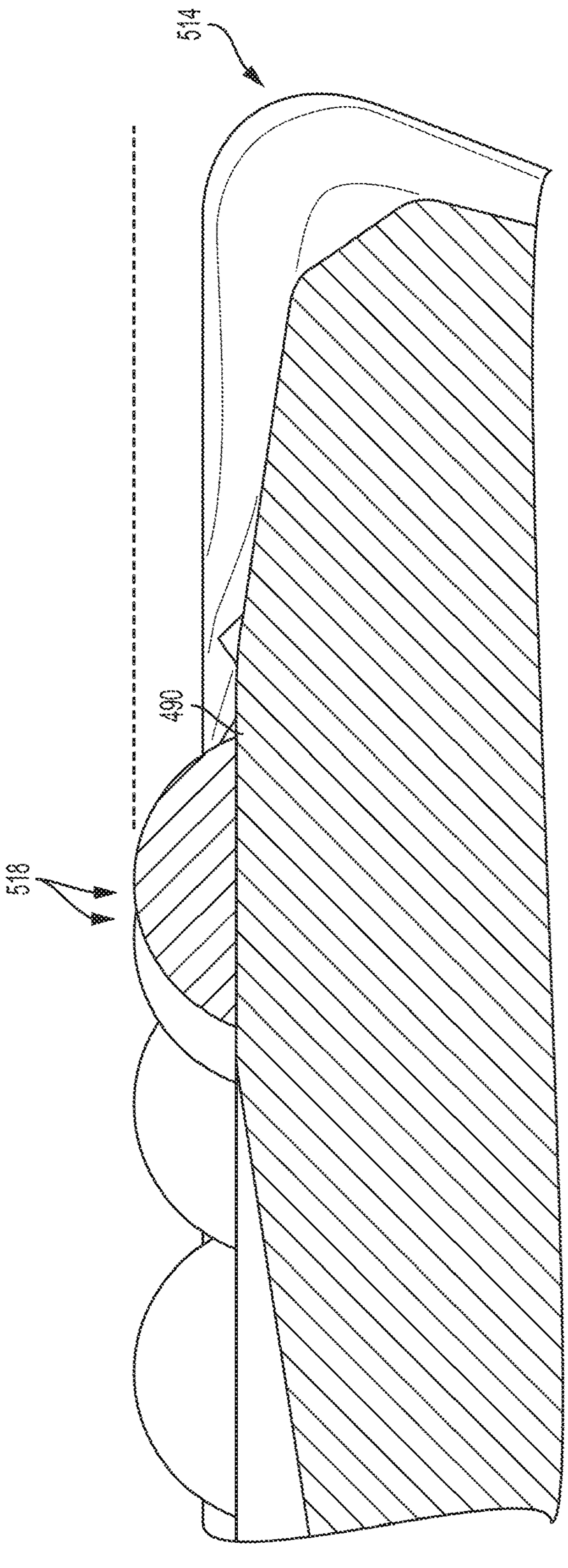
FIG. 12 is an enlarged cross-section of the cutting disc of FIG. 11 viewed along section 12-12.

Positioning the wear bits 518 on the end surface 490 enables the wear bits 518 to absorb an axial load on the cutting disc 450 from the rock wall during operation. The wear bits 518 accordingly also prevent wear on the end surface 190 of the cutting ring 478. In the illustrated embodiment, the wear bits 518 protrude beyond the cutting bits 514 in an axial direction (FIG. 12). In some constructions, the cutting bits 514 may originally protrude in an axial distance from the cutting disc 450 beyond the wear bits 518, such that the cutting bits 514 wear axially until they reach the level of the wear bits 518. When the wear bits 518 protrude by an equal (or greater) axial distance to the cutting bits 514, the wear bits 518 degrade and wear, absorbing some of the cutting load. As a result, the wear bits 518 can slow the wear on the cutting bits 514 in order to prolong the operational life of the cutting disc 450 (FIG. 12).

Figure 13:
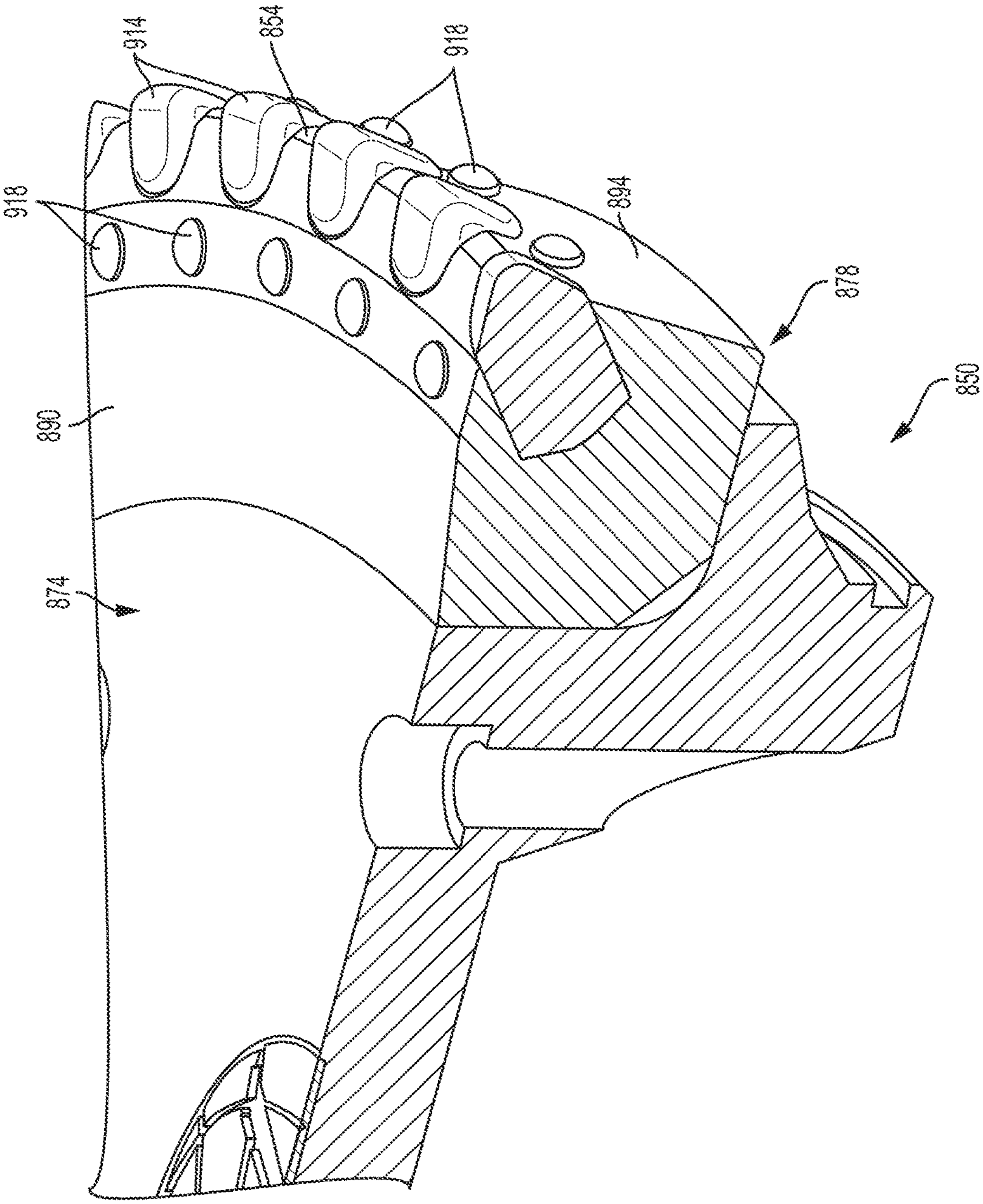
FIG. 13 is a perspective view of a cross section of a cutting disc according to another embodiment.
Figure 14:
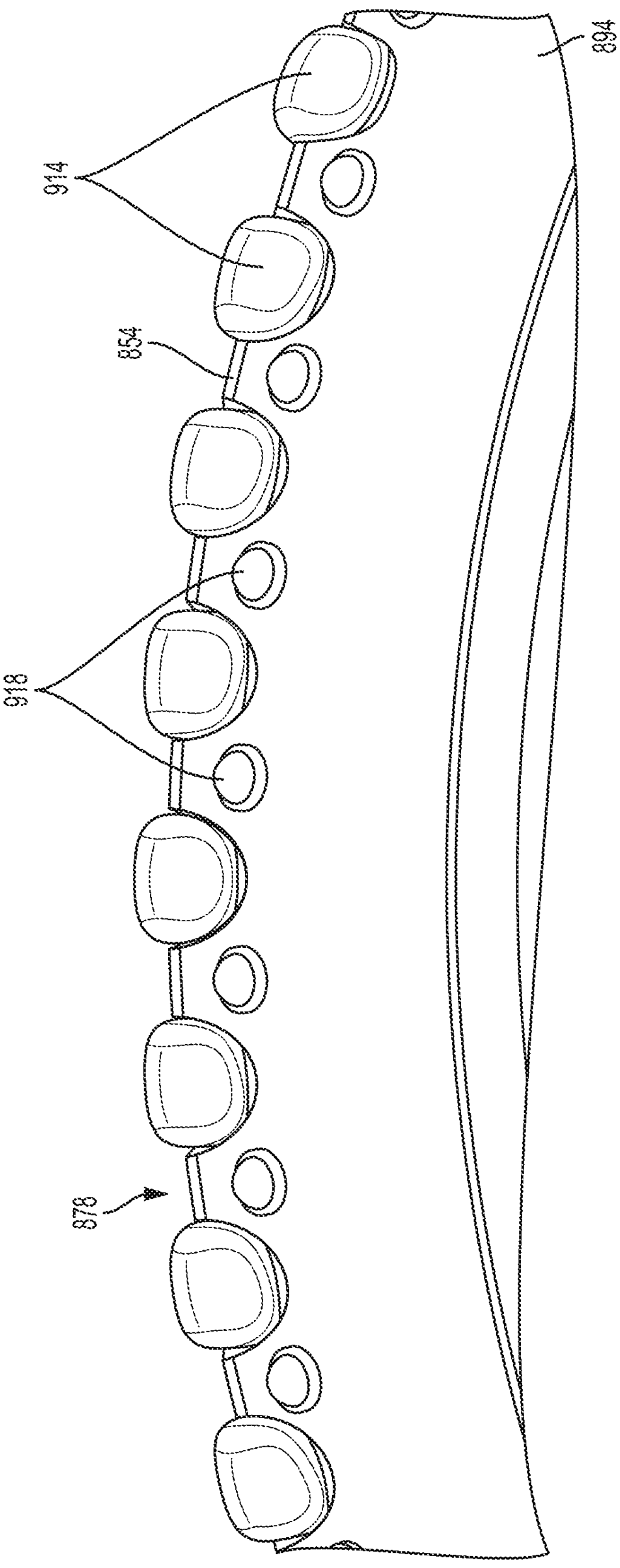
FIG. 14 is a side view of a portion of the cutting disc of FIG. 13.

FIGS. 13-14 illustrate a cutting disc 850 according to a third embodiment. The cutting disc 850 is similar to the cutting disc 450 described above, and similar features are identified with similar reference numbers, plus 400. The cutting disc 850 includes cutting bits 914 disposed at regular intervals along a peripheral edge 894 of a cutting ring 878, and wear bits 918 are disposed on both an end surface 890 of the cutting ring 878 and on a lateral or peripheral surface 894 of the cutting ring 878. Each of the cutting bits 914 and the wear bits 918 are substantially similar to the cutting bits 114 and wear bits 118 described above. It should be noted that the placement of the wear bits 918 according to this construction may be used in place of, or in conjunction with, the placement of wear bits 118 from the construction of FIGS. 3-6. In addition, in other embodiments (not shown), the wear bits 918 may be positioned only on the lateral surface 894 of the cutting disc 950.

With continued reference to FIGS. 13-14, the positioning of the wear bits 918 similarly enables the wear bits 918 disposed on the end surface 890 to absorb an axial load on the cutting disc 850 from the rock wall during operation. The wear bits 918 disposed on the lateral or peripheral surface 894 of the cutting disc 850 minimize penetration of the cutting bits 914 into the rock wall to reduce the detrimental effects of large, repetitive impact forces on the cutting bits 914. In addition, the wear bits 918 increase an area of contact for the cutting disc 850, thereby reducing overall wear on the cutting bits 814 and the cutting disc 850.

Although various aspects have been described in detail with reference to certain embodiments, variations and modifications exist within the scope and spirit of one or more independent aspects as described. Various features and advantages are set forth in the claims.

What is claimed is:

1. A cutting device for cutting rock, the cutting device comprising:

a disc rotating about an axis of rotation, the disc including a peripheral edge;

a plurality of cutting elements secured to the disc, the cutting elements spaced apart from one another along the peripheral edge of the disc; and a plurality of wear elements secured to the disc, the wear elements spaced apart from one another and from the cutting elements, the wear elements being constructed from a material having a hardness greater than a hardness of the cutting elements.

2. The cutting device of claim 1, wherein the cutting elements protrude from the disc in a first direction by a first distance, and wherein the wear elements protrude from the disc in the first direction by a second distance less than the first distance.

3. The cutting device of claim 2, wherein the first direction is oriented substantially parallel to the axis of rotation.

4. The cutting device of claim 1, wherein each wear element is positioned between adjacent cutting elements.

5. The cutting device of claim 1, wherein at least some of the wear elements are positioned on the peripheral edge of the disc, each wear element on the peripheral edge being positioned between two adjacent cutting elements.

6. The cutting device of claim 1, wherein at least some of the wear elements are spaced apart from the peripheral edge and positioned in a plane oriented substantially perpendicular to the axis of rotation.

7. The cutting device of claim 1, wherein at least some of the wear elements are spaced apart from the peripheral edge and positioned on a peripheral surface extending around the axis of rotation.

8. A cutting head for removing rock from a rock wall, the cutting head comprising:

a boom configured to be supported on a frame;

a drive mechanism; and a cutting device supported on the boom and driven by the drive mechanism, the cutting device including, a disc rotating about an axis of rotation, the disc including a peripheral edge, a plurality of cutting elements secured to the disc, the cutting elements spaced apart from one another along the peripheral edge of the disc, and a plurality of wear elements secured to the disc, the wear elements spaced apart from one another and from the cutting elements, the wear elements having a hardness greater than a hardness of the cutting elements.

9. The cutting head of claim 8, wherein the cutting elements protrude from a surface of the disc in a first direction by a first distance, and the wear elements protrude from the surface of the disc in the first direction by a second distance less than the first distance.

10. The cutting head of claim 9, wherein the first direction is oriented substantially parallel to the axis of rotation.

11. The cutting head of claim 8, wherein at least some of the wear elements are positioned on the peripheral edge of the disc, each wear element on the peripheral edge being positioned between two adjacent cutting elements.

12. The cutting head of claim 8, wherein at least some of the wear elements are spaced apart from the peripheral edge and positioned in a plane oriented substantially perpendicular to the axis of rotation.

13. The cutting head of claim 8, wherein at least some of the wear elements are spaced apart from the peripheral edge and positioned on a peripheral surface extending around the axis of rotation.

14. A cutting device comprising:

a disc rotating about an axis of rotation, the disc including a peripheral edge;

a plurality of cutting elements secured to the disc, the cutting elements spaced apart from one another along the peripheral edge of the disc, each of the cutting elements protruding from the disc in a first direction by a first distance; and a plurality of wear elements secured to the disc, the wear elements spaced apart from one another and from the cutting elements, at least some of the wear elements being offset from the peripheral edge in either a direction parallel to the axis of rotation or a direction perpendicular to the axis of rotation.

15. The cutting device of claim 14, wherein each of the cutting elements has a first hardness, wherein each of the wear elements has a second hardness greater than the first hardness.

16. The cutting device of claim 14, wherein the at least some wear elements are oriented to protrude from the disc in a direction substantially parallel to the axis of rotation.

17. The cutting device of claim 14, wherein the at least some wear elements are oriented to protrude from the disc in a direction substantially perpendicular to the axis of rotation.

18. The cutting device of claim 14, wherein at least some of the wear elements are positioned in an alternating configuration with the cutting elements.

* * * * *